UNITED STATES PATENT OFFICE.

AUSTIN G. DAY, OF SEYMOUR, CONNECTICUT.

IMPROVEMENT IN ASPHALTUM OR CONCRETE PAVEMENTS.

Specification forming part of Letters Patent No. 104,562, dated June 21, 1870.

*To all whom it may concern:*

Be it known that I, AUSTIN G. DAY, of Seymour, in the county of New Haven and State of Connecticut, have invented certain new and useful Improvements in Asphaltum or Concrete Pavements for streets, sidewalks, and other purposes; and I hereby declare that the following is a full, clear, and exact description of the same.

The nature of my invention consists in combining with the asphaltum and coal-tar employed in pavements of this class such metallic ores as are found in nature to have sulphur united with them, or metallic oxides with sulphur added to them, and also, sometimes, acids, and then subjecting this compound to a vulcanizing-heat. I prefer that after the materials have been thus treated they should have sand, gravel, or broken stone mixed with them; but this is not essential, though I consider that it greatly improves the pavement.

To enable others to make use of my improvements, I will describe the manner in which I usually mix and prepare the materials mentioned to form my pavement.

I prefer to take about two parts of asphaltum or bitumen and about one part of coal-tar, or similar proportions of other equivalent hydrocarbons, and combine them together in any suitable vessel or receptacle at a temperature sufficiently high to bring them into quick fusion, after all watery vapor has been expelled from them. I do not, however, limit myself to these proportions, as the ratio of the ingredients may be considerably varied, according to their purity and the character of the pavement required. While these materials are being combined, or after they have been united, I prefer to add to them acid in the proportion, preferably, of from three to fifteen ounces to every one hundred pounds of the asphaltum employed, though the quantity of the acid will usually depend upon its quality and upon the quantity and quality of the hydrocarbons and the hereafter-mentioned metallic ores or oxides used in the compound, and also upon the nature of the pavement required. I find that for this purpose sulphuric acid is preferable, but nitric or muriatic acid will answer the purpose, if desired. I also, preferably, add to the mass either light or heavy coal or petroleum oil, the amount of which will depend upon its quality and that of the asphaltum and tars, and upon the nature of the pavement desired. Usually, however, from five to fifteen pounds of oil to every one hundred pounds of asphaltum will suffice. I next vulcanize the hydrocarbons in the compound by combining with the herein-referred-to materials such metallic ores as in a natural state are found with sulphur united with them, as, for instance, preferably, the sulphuret of iron, or metallic oxides with sulphur added to them. The office of these substances is to harden the mass; and in using them I prefer them to be in a finely-pulverized condition; and, as stated, I preferably employ for the purpose those ores which contain sulphuret of iron, and are therefore of but little value for other uses. Or I may employ finely pulverized iron pyrites, and, when I do, no sulphur additional to that in the pyrites will be needed. Other metallic ores or oxides may also be used if desired, the necessary quantity of sulphur being added to them. The quantity of the ores or oxides and sulphur, or of the pyrites, may be varied; but I have found that an aggregate of these ingredients equal to about from one-fifth to one-third of the total weight of the hydrocarbons will operate well in practice.

To perform the vulcanization, I heat the compound in a suitable heater or boiler to a temperature from about 300° to about 450° Fahrenheit, and continue the heat for a time long enough to effect the transformation or vulcanization of the hydrocarbons under the influence of the sulphur, acids, and the metallic ores or oxides. The length of heating in each specific case will vary according to the quality of the materials used and the character of the pavement required, and will be readily determined by the experience of the workmen; but from half an hour to an hour and a half will generally suffice. When the change produced by the chemical action of the sulphur becomes manifest, I withdraw the batch quickly from the boiler, and then, by preference, commingle with the materials, by rapid manipulation, sharp sand, clean gravel or broken stone, one part of the compound being generally found to unite with and hold in commixture four to six parts, preferably by measure, of the silicious material, so as to form a hard and compact mass, which will possess a certain degree of elasticity, as well as tenacity and firmness, which qualities adapt the product to all the requirements of a pavement for streets and other thoroughfares. The compound will become hard as soon as it is laid, and roads or walks prepared with it may be used immediately.

My pavement possesses the essential characteristics of the French asphalt pavement; but it is adapted to withstand the high temperatures of American summers, which soften the French material. It presents at all times a smooth and uniform surface and offers a good foot-hold for animals.

It may also readily be mended after it has been broken up for gas or water repairs, or from other causes, inasmuch as at a higher temperature than that at which the pavement is prepared the new material will solder to the old and leave no trace of the mending.

This pavement may be laid upon any suitable foundation, such as sand rammed hard, gravel, or concrete; though, if the latter be used, it is necessary that its surface should be quite dry before my compound is laid upon it, or else the watery vapor escaping from it will greatly impair the value of the work. If desired, the sand, gravel, or broken stone may be omitted from my compound, and the latter laid down without it; but I prefer to have it present.

Any suitable tools and apparatus may be used for the manipulation of my preparation; but I may state that I prefer the system in use by the French for the preparation of their asphalt pavements. In all essential particulars this system will be found well adapted to the requirements of my invention.

I am aware that it has before been proposed to employ sulphur in combination with hydrocarbons for pavements, and also to neutralize any excess of sulphur in such combinations by adding metallic oxides to unite with the free sulphur and form metallic sulphurets. But this is unlike my improvement, and will not produce the result at which I aim. I specially desire the presence in the compound of the metallic base, in order to obtain the benefits in the pavement of the action of the sulphur upon such base; and I therefore use proportions of my materials as above stated, and combine them in manner as described, in order to insure the presence and active agency in the compound of the metallic base, in lieu of adopting such proportions of ingredients and such a mode of combination as will merely cause the metallic base to neutralize an excess of sulphur.

Having thus described my improvements, what I claim as new, and desire to secure by Letters Patent, is—

1. The above-described hard compound for pavement and other purposes, consisting of hydrocarbons combined with metallic ores or oxides and sulphur, prepared substantially in the manner set forth.

2. The material for pavement and other purposes, consisting of hydrocarbons in combination with metallic ores or oxides, and with sulphur and acid, either with or without oils, substantially as described.

3. The material for pavement and other purposes, consisting of the above-described hard compound, composed and prepared as stated, and either with or without acid or oils, in combination with stone, sand, or other silicious substances, substantially as set forth.

AUSTIN G. DAY.

Witnesses:
ISRAEL STONE,
T. B. BEECHER.